April 16, 1957
W. H. EVANS
2,788,683
LINE REAMING AND BORING MACHINE
Filed Jan. 14, 1954
2 Sheets-Sheet 1
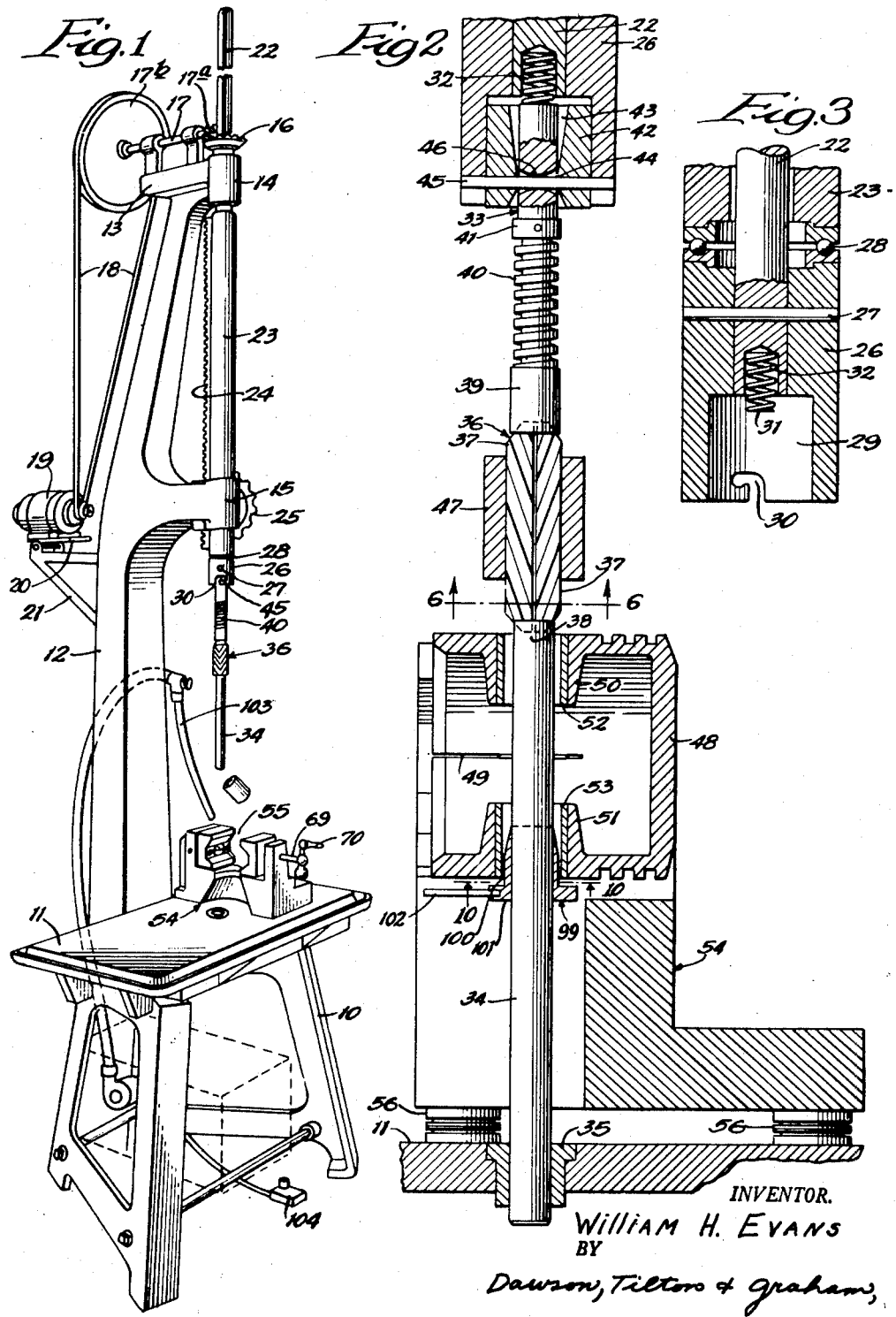
INVENTOR.
William H. Evans
BY
Dawson, Tilton & Graham,
ATTORNEYS April 16, 1957 W. H. EVANS 2,788,683
LINE REAMING AND BORING MACHINE
Filed Jan. 14, 1954 2 Sheets-Sheet 2
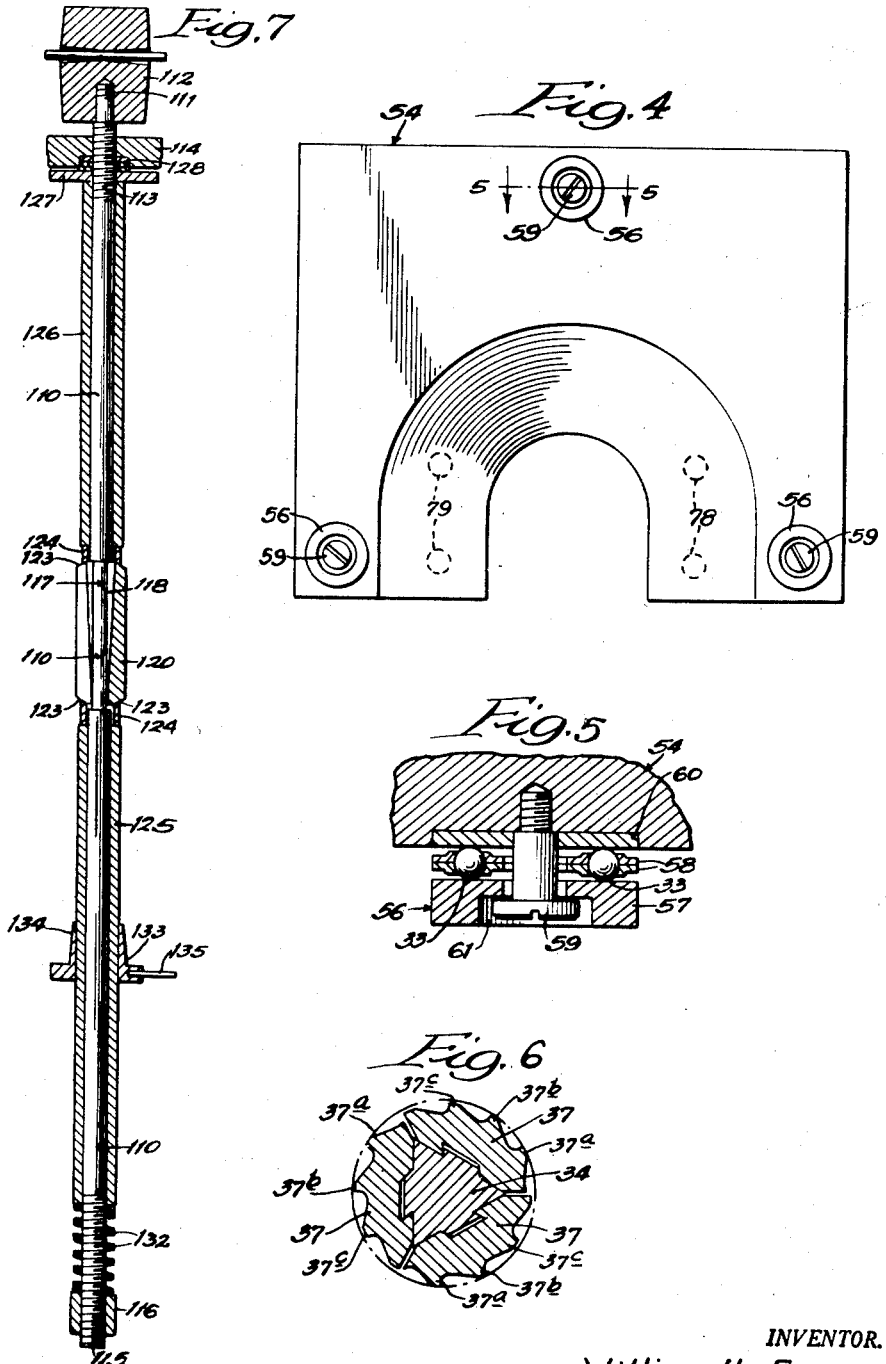
INVENTOR.
William H. Evans
BY
Dawson, Tilton + Graham,
ATTORNEYS

United States Patent Office 2,788,683
Patented Apr. 16, 1957

2,788,683

LINE REAMING AND BORING MACHINE

William H. Evans, Miami Beach, Fla.

Application January 14, 1954, Serial No. 404,006

The portion of the term of the patent subsequent to March 2, 1971, has been disclaimed 2 Claims. (Cl. 77—4)

This invention relates to reaming and boring apparatus, and more particularly to an expansion type line reaming and boring machine. The apparatus is especially useful in the reaming of automobile piston bearings, but is adapted for other uses.

The present application constitutes a continuation-in-part of my co-pending applications, Serial No. 290,450, filed May 28, 1952, now abandoned, and Serial No. 246,814, filed September 15, 1951, now Patent 2,670,635.

I have in the two patent applications mentioned above described and claimed reaming and boring apparatus that is especially useful in reaming automobile piston bearings. The apparatus has met with considerable success, for it provides a number of advantages over known apparatus for reaming bearings, etc. While this apparatus has been quite successful, it would be desirable to increase the life of the cutting segments used in the reaming and boring operations. The present application is concerned particularly with this problem.

I have discovered that the cutting edges of the reamers are dulled quite rapidly because of the effects of vibration present in the apparatus. The vibration apparently causes portions of the cutting edge of the reamer segments to flake off, leaving small flat surfaces on the cutting edges that generate considerable heat because of friction during a cutting operation. As the flattened surface becomes wider through use and through the further effects of vibration, considerably more heat is generated in a boring or reaming operation and in a very short time this brings about a dulling of the cutting edges and the reamer segments must be resharpened. Generally speaking, the sharper the cutting edges of the reamers are, the less heat generated and the longer the life of the cutting segments between sharpenings. It will be appreciated then that a reaming and boring apparatus wherein vibration is minimized would be a valuable contribution.

It is accordingly an object of this invention to provide reaming and boring apparatus wherein the effects of vibration are dampened and substantially minimized. Another object of the invention is to provide in line reaming and boring apparatus means for supporting an elongated mandrel that carries the reaming segments so that the vibratory effects of the drive means for rotating the mandrel are not transferred thereto. A further object of my invention is to provide means in my line reaming and boring machine for preventing the spindle vibrations from being transferred to the reamer while it is engaging the work piece, and to prevent the vibrations in the bed supporting the work holder from being transferred to the work holder during a reaming operation, whereby the cutting edges of the reamer can be kept sharp over prolonged periods of use. Yet a further object is to suspend the reamer mandrel from the reamer chuck by a universal joint to dampen the transfer of vibrations from the chuck to the mandrel. Additional objects and advantages will appear as the specification proceeds.

Embodiments of the invention are illustrated in the accompanying drawings, in which Figure 1 is a perspective view of apparatus embodying the invention; Figure 2 is an enlarged vertical sectional view showing a piston secured in position for reaming; Figure 3 is a detail sectional view of the rotatable head secured below the rack sleeve, with the rack sleeve and spindle broken away; Figure 4 is a bottom view of the work holder; Figure 5 is a detail sectional view of one of the pedestals of the work holder taken on the line 5—5 of Figure 4; Figure 6 is a transverse sectional view of the reamer taken on the line 6—6 of Figure 2; and Figure 7 is a vertical sectional view of a modified form of the invention.

In the illustration given, 10 designates a frame which may be of any suitable construction, and upon it is supported a horizontal bed 11. Extending above the bed 11 is a standard 12 providing at its top a pulley wheel mounting 13. The standard 12 provides at its upper end a sleeve bearing 14 and at an intermediate point below a sleeve bearing 15. Within the bearings 14 and 15 is supported reamer apparatus including a reamer spindle, means for rotating the reamer spindle, and means for raising and lowering the reamer spindle. Mounted within bearing 14 is a gear equipped sleeve 16 and the gear thereof meshes with a gear 17a mounted on the end of shaft 17. Shaft 17 is equipped on the other end with a large pulley wheel 17b drivably connected by V-belt 18 to the 3-speed pulleys of motor 19. To provide for the adjustment of belt 18 and to maintain the tension therein, motor 19 is supported on pivotally mounted platform 20, which in turn is attached to standard 12 by bracket 21. Since this structure is well known in the art, it is not believed that it will be necessary to further describe it herein.

Keyed to the gear sleeve 16 is a reamer spindle 22 so that the shaft 22 is rotated with the gear sleeve 16 while being vertically movable relative thereto.

To raise and lower the reamer spindle, I provide a rack sleeve 23 which is slidably mounted within bearing 15, shaft 22 being rotatably anchored to the sleeve 23 for vertical movement therewith while rotating independently thereof. The rack 24 of the sleeve 23 is engaged by a gear operated by a manually-operated wheel 25. As seen more clearly in Fig. 3, spindle 22 is extended below sleeve 23 and is rigidly secured to rotatable head 26 by pin 27. Thrust bearings 28 are provided between the lower end of sleeve 23 and rotating head 26. The lower end of head 26 is recessed to provide a socket 29 adapted to act as a chuck in receiving the upper end of the reamer mandrel. Inverted hook-shaped slots 30 are provided on opposite sides of the lower end portions of the walls of socket 29. Slots 30 cooperate with spring 31 which is wedged within recess 32 in the lower end of spindle 22 to retain the upper end of the reamer mandrel within socket 29. While other reamers can be employed in my apparatus, I prefer to employ reamers constructed in accordance with the disclosure in my U. S. Patent No. 2,421,490, issued June 3, 1947, including the improvement described in my U. S. Patent No. 2,537,818, issued January 9, 1951.

A reamer assembly constructed in accordance with the disclosure of these patents is shown more clearly in Fig. 2. In the illustration given, this reamer assembly comprises a solid mandrel 33 having its lower portion provided with a smooth extension 34 adapted to extend through a bearing 35 in bed 11. Above the smooth extension is a reamer 36 having three cutting segments 37 symmetrically positioned about and interlocked with a triangular core portion of mandrel 34, as shown more clearly in Fig. 6. The preferred means of interlocking the core and cutting segments is described in greater detail in my Patent No. 2,421,590 mentioned above.

The outside surfaces of the cutting segments 37 are provided with spiral flutes 37a terminating in lands 37b to form a plurality of cutting edges 37c, which extend between vertically spaced points. In the manufacture of this expansion type of segmented reamer, it has been found practically impossible to form an assembled reamer in which all of the cutting edges are at equal radial distances from the central axis of the mandrel. Heretofore, this has been considered to be a disadvantage inherent in this type of reamer. However, I have now discovered that when this type of reamer is employed in combination with a work holder of a type which will subsequently be described, it is highly desirable to have one of the cutting edges lying at from .002 to .007 of an inch greater radial distance from the vertical axis of the reamer in that it serves as a flycutter and guide during the boring operation. This will subsequently be described in greater detail.

Reamer segments 37 can be secured against longitudinal movement with respect to mandrel 34 by any suitable means. In the illustration given, an annular notch is provided in mandrel 34 adapted to receive the tapered lower ends of reamer segments 37, as indicated at 38 in Fig. 2. The upper ends of the cutting segments can be clamped beneath a slidably mounted retainer 39, which can be backed by a compression spring 40. An adjustment nut 41 can be used to regulate the compression in spring 40.

Mandrel 24 can be secured in a number of ways to spindle 22 so that it will be constrained to rotate therewith. However, I prefer to interpose between reamer 36 and spindle 22 a universal joint adapted to limit the transfer of vibrations, and particularly vibrations in horizontal planes, from spindle 22 and the members in proximity to spindle 22 to reamer 36. My reason for wishing to dampen the transfer of vibrations from the upper structural members of my apparatus to reamer 36 involves my discovery of a prime cause of reamers becoming rapidly dulled by use. Reamers of the type which I prefer to employ have feather-like cutting edges composed of very hard metal. Through my experiments I find the cause of reamers getting dull is due to vibration. Vibration flakes off the cutting edge of the reamer, which leaves a small flat surface that starts to generate heat from friction. As this surface gets wider, the heat increases and in a short time the reamer needs resharpening. The sharper the reamer is, the less heat it generates. At the present time, all work is held in the hand while reaming. This is the first reason for vibration. By designing a machine that holds all work solid, while having your reamer and work holder or jig floating, I eliminate substantially all vibration. This has all been proven by doing ten times more reaming on my machine without resharpening the blades than the old way of holding the work by hand with the same reamer.

As previously indicated, I prefer to interpose a universal joint between the reamer and the spindle to limit the downward transfer of vibrations. I have found it convenient to suspend the mandrel from the spindle by a universal joint. In the illustration given, this is accomplished by securing a collar 42 to the upper end of mandrel 33 by means permitting the mandrel to move laterally or execute limited amplitude movements within collar 42. In the illustration given, collar 42 is provided with an opening 43 and tapering inwardly from both ends to form a narrow ring of reduced diameter at 44. I would prefer to have the diameter at 44 just slightly greater than the diameter of the head of mandrel 33 so that the mandrel will be prevented from shifting horizontally on pin 45 which extends through collar 42 and mandrel 33 and projects outwardly on each side of collar 42. As indicated at 46, the portions of mandrel 33 in contact with pin 45 are rounded to cooperate with the inwardly tapered sides of recess 43 in providing a universal joint. It will be understood, of course, that other types of universal joints can be employed.

A reamer assembly can be secured to rotatable head 26 by inserting collar 42 within recess 29 and maneuvering the projecting ends of pin 45 through slots 30 while pressing upwardly against spring 32 until the outer ends of pin 45 are seated in the upper portions of the slots. A similar method is followed in detaching the reamer.

A reamer gauge 47 may be slipped over the smooth extension 34 and about the reamer 36, as shown in Fig. 2, in order to insure a reamer of the desired diameter; however, the gauge 47 is removed from the reamer prior to the reaming operation.

A typical piston is indicated by the numeral 48 in Figs. 2 and 4. The skirt of the piston is shown provided with a slot or split 49. Piston 48 has upper and lower bosses 50 and 51, and within the bosses are the wrist pin bearings 52 and 53.

In order to support the piston accurately, I provide a work holder 54 which may consist of a single member providing a recess through which the reamer mandrel may extend. In the specific illustration given, I provide a casting having a U-shaped opening 55 therethrough adapted to receive the reamer. It will be apparent, however, that work holder 54 need not be integrally formed, but rather can be composed of several parts.

I have found that reaming operations with my apparatus are greatly improved by supporting work holder 54 on a plurality of anti-friction or thrust bearings which are adapted to permit limited movement of the work holder through planes perpendicular to the reamer with a minimum of friction. As indicated above, in order to conserve the cutting edges of the reamer and to prevent these edges from becoming dulled, it is desired to prevent vibrations from being transferred to the reamer from other parts of the apparatus. I have already discussed the means of preventing the vibrations from being transferred from the spindle and the upper portions of the apparatus to the reamer. It will be apparent, however, that not only is it important to prevent vibrations from being transferred to the reamer, but that it is also important to prevent vibrations from being transferred to the work piece, since vibrations in the work piece will also tend to cause flaking of the cutting edges of the reamer. This is one of the reasons why I prefer to support my work holder on thrust bearings. In this way, work holder 54 is given a floating action with respect to bed 11 so that the transfer of vibrations, and particularly horizontal vibrations, from the bed to the work holder is dampened.

Another important result of supporting work holder 54 on a plurality of thrust bearings is that the work piece therein is thus permitted to follow the motion of the reamer. This prevents the reamer from cutting a larger hole than desired because of a variation in the trueness of the reamer. Long reamers, such as I prefer to employ, tend to run out from 5 to 10 thousandths of an inch from the center, which produces a whip while the reamer is engaged with the work piece and thereby causes the hole to be larger than desired. This tendency of the reamer to cut oversize is overcome by supporting the work holder on thrust bearings which permit the work piece to follow the slightly radial or amplitude movements of the reamer during the reaming operation.

I have also discovered that the floating action of the work holder cooperates with the reamer in still another way to produce perfectly round holes. As indicated above, I prefer to employ segmented reamers of the expansion type in which one of the cutting edges is at a greater radial distance from the reamer axis than the other cutting edges. When the work holder is supported on thrust bearings so that it can move with respect to bed 11 with substantially no friction, the cutting edge at the greatest radial distance from the central axis of the reamer acts as a guide in shifting the work holder on the thrust bearings during the reaming operation. To achieve this result, it is important that the frictional resistance to the movement of the work holder be equal in all directions. If the frictional resistance to motion in one direction is substantially greater than in another direction, this will tend to produce egg-shaped holes.

In accordance with my invention, work holder 54 can be supported on thrust bearings in any suitable way so as to permit limited radial movement. I prefer, however, to incorporate the thrust bearings in support pedestals. In the illustration given, I employ pedestals 56 which are formed from support disk 57, rings 58, and screws 59, as shown more clearly in Fig. 5. Within rings 58 there are rotatably supported a plurality of balls 33 which are adapted to bear against the under surface of bearing washers 60 which are embedded in the underside of the work holder. Clearance is provided about the shank portion of screw 59 from rings 58 and support disk 57 to permit relative motion between the parts. For a similar reason, recess 61 is made substantially larger than the head of screws 59 to permit radial movement of the head within the recess.

In the illustration given, and preferably, three support pedestals 56 are fastened to the bottom surface of the work holder 54 in spaced-apart relation around the periphery thereof. While more than three pedestals can be employed, I prefer to limit the number of pedestals to three so that the work holder will be supported on bed 11 without tipping during the reaming operation. As can readily be appreciated, it is almost impossible to have the surface of bed 11 exactly perpendicular to the axis of the reamer, and, therefore, there would be a tendency of the work holder to tip if it were supported on more than three pedestals during the reaming operation.

In order to provide adjustment of the clamping blocks mounted within the work holder 54, as is shown in Fig. 1, an actuating rod 69 is provided, and, if desired, the rod may be equipped with a handle 70 at the outer end thereof to assist in turning it to vary the position of the clamping blocks. The clamping blocks may be spring biased, as disclosed more completely in co-pending application Serial No. 246,814, now Patent No. 2,670,635, previously referred to, and the springs may be received within the recesses 78 and 79 that are illustrated in Figure 4.

In the positioning of the wrist pin bearings 52 and 53 with respect to the reamer mandrel 33, it is important that guide means be employed which have sufficient bearing points to enable such positioning to be accurate to the highest degree. To bring about this result, I prefer to employ a hollow bushing or tapered collar 99, as illustrated more clearly in Fig. 2. The bushing is of a diameter permitting it to make a firm sliding contact with the lower end portion 34 of the reamer shaft. The side walls of the tapered portion are preferably cut away to form oppositely-disposed flattened portions 100. The bushing also includes a disk portion 101 to which is connected a guide pin 102. With the structure, there is provided a four-point contact between the tapered bushing 99 and the bearing 53 of the piston 48. The purpose of flattened portions 100 is to allow cooling oil to pass the bushing.

If desired, cooling liquid for the reaming operation can be supplied through a tube 103 from any suitable source of supply and supported for directing the fluid at the desired point on the work. Also, the valve of the fluid line and the switch for the motor 18 can both be controlled by a single pedal 104 located for operation by the foot of the operator, as illustrated in Fig. 1.

Operation

In the operation of the structure thus far described, the operator places a piston within the holder 54, as is illustrated in Fig. 2, and the piston is then aligned and clamped tightly in position. The reamer is then lowered by rotating wheel 25 to bring the lower portion 34 of the reamer mandrel into the position illustrated in Fig. 2. Bushing 99, which has been previously inserted on the lower end portion 34, is pushed upwardly and brought into engagement with the inside surface of bearing 53, as is also shown in Fig. 2. The motor 18 and the flow of oil are both started by depressing the foot pedal 104 while continuing to urge bushing 99 upwardly with the tips of the fingers of one hand to center the piston, the other hand of the operator being used to rotate wheel 25 to bring the reamer 36 into contact with upper wrist pin bearing 52.

Thereafter, the operator rotates handle 70 to tightly clamp the piston in position for completed reaming operation. During the entire reaming operation, the thrust bearings within pedestal 56 supporting the work holder 54 dampen the transfer of vibrations from horizontal bed 11 to the work holder 54. Similarly, the universal joint provided by collar 42 and pin 45 dampens and limits the transfer of vibrations from spindle 22 to reamer 36. Thus both the reamer and the work holder are allowed to float during the reaming operation with a minimum of vibration, while the cylinder is held solidly. This has the result of keeping the reamer sharp for greatly increased periods of use. In actual operation, it has been determined that the cutting edges of the reamers will stay sharp for at least ten times more reaming operations than previously.

A modification is illustrated in Fig. 7, and in the illustration given, 110 designates a mandrel having an upper reduced end portion 111 threadably engaging a hardened bushing 112 adapted to be connected to a rotary drive shaft in a line-reaming machine, as illustrated generally in my Patent No. 2,584,005 and in my co-pending application Serial No. 264,169, filed December 29, 1951, now Patent No. 2,731,858.

The mandrel 110 is provided at its inner end adjacent the bushing 112 with a threaded portion 113 on which is mounted an adjusting nut 114. The mandrel at its outer or free end is also provided with a threaded portion 115 on which is mounted an adjusting nut 116.

At an intermediate portion, the mandrel 110 is provided with an integral tapered segment-bearing surface 117. The segment-bearing surface 117 has a raised portion 118 undercut at one side to provide a hook-like connection, as is seen in Fig. 6 and as has been heretofore described.

About the tapered surface 117 are mounted three cutting segments 120, each of which has on its inner side a supporting surface shaped generally to correspond to the supported surface 117 and having a recess for receiving the hook-like connection or support, all as shown in Fig. 6. The cutting segment and tapered supporting surface are described more fully in my Patent No. 2,421,490.

The cutting segments are provided at each end with beveled surfaces 123, and such surfaces are engaged by retainer rings 124. Preferably, the retainer rings 124 also have beveled surfaces meeting the inclined or beveled surfaces 123. Below the lowermost retainer ring 124 is a tubular retainer member 125, and above the upper retainer ring 124 is a tubular retainer member 126. If desired, the retainer ring 124 and its adjacent tubular retainer member may be combined in a single tubular retainer member. I prefer, however, to employ the separate parts 125 and 124 on the lower side of the cutting segments 120 and the parts 124 and 126 on the upper side of the cutting segments 120. The upper tubular member 126 is preferably equipped with a flange member 127. A thrust bearing 128 is carried by the upper adjusting nut 114 and the adjusting nut 114 may be provided with index marks. Cooperating index marks may be carried by the flange or member 127.

In the structure shown, the tubular retainer member 126 and the member 127 are held by reason of their frictional engagement with ring 124 and the cutting segments 120 against rotation while the adjusting nut 114 may be rotated freely without causing corresponding rotative movement of member 127. Thus the index marks on the two members 114 and 127 may serve to indicate the increase or decrease of the reamer size in thousandths. The adjusting nut 114 is preferably provided with a knurled portion to facilitate the rotation of the nut in making the changes in the reamer size.

Extending between the lower tubular retainer 125 and the lower adjusting nut 116 is a spring 132. The nut permits the spring pressure to be exerted upon the blades or cutting segments as desired.

By having the spring on the outer or free end of the reamer structure, the pressure will thus not be exerted against the spring and with the structure shown it is possible to ream both bearings of a six-inch piston in one stroke.

In the operation of the reamer structure, when it is desired to increase or decrease the size of the expansion reamer elements, the operator simply rotates the adjusting nut 114 to bring about the desired positioning of the blades 120, and the adjustment is made without friction through the use of the feed thrust bearing. The retainer rings 124 prevent the backing up of the reamer blades or cutting segments while adjusting the reamer for size. Such adjustment is rendered highly effective through the use of rings on both sides of the cutting segments. Spring pressure to the desired extent is exerted upon the reamer blades or cutting segments by adjusting the nut 116 and since the spring is on the outer side of the cutting segments, the pressure will not be exerted in the cutting operation against the spring.

With the reamer blades adjusted to provide the desired outside diameter by manipulating the adjusting nut 114, the reamer may be then set in operation and passed through the piston pin bearing or connecting rod bearing or such other bearing which is to be reamed.

If desired, the reamer may be provided with a removable centering piece 133 having a tapered upper portion 134 and a pin extension or handle 135. Such a structure is described more fully in my Patent No. 2,584,005.

While I have shown the ring 124 and the upper tubular retainer 126 as separate parts, it will be understood that such parts may be combined and it will be understood also that the member 126 may be combined with the member 127 as an integral part. Similarly, the tubular member 125 may be combined with the lower ring 124. I prefer, however, to employ the structure shown, since the universal rings 124 at both ends of the reamer blades guard against any backing up of the reamer blades while the reamer is being adjusted for size.

It will be appreciated that in driving the spindle 22 considerable vibration will be transferred thereto to the driving mechanism. More specifically, the motor 19, belt 18, pulley wheel 17b and the gears 17a and 16 will in themselves create considerable vibration during their operation, and all of the vibratory effects will be transmitted to the spindle 22. The transfer of such vibrations to the reamer or cutting segments would be undesirable if for no other reason than the distortion of the bore reamed by the apparatus. In the structures illustrated, provision is made to ream a piston in one operation, and, therefore, the mandrel 23 must be of considerable length, and any vibrations transferred thereto would be considerably amplified. Serious chatter, distortion of the bore, flaking of the cutting edges of the reamer and production of flat spots about the reamed bore would result.

In the structure I have provided, however, the vibration appearing at the spindle 22 is not transferred to the mandrel 23, and cutting segments carried thereby, because of the universal joint connection which permits slight horizontal movements of the spindle drive without disturbing the alignment of the mandrel 23. The mandrel is suspended by the universal joint and is free to pivot laterally in substantially all directions, independently of the drive spindle 22. In actual practice, it has been determined that the life of the cutting segments has been appreciably increased by eliminating the transfer of vibration to the mandrel and cutting segments. The life, in fact, has been increased up to from ten to twenty times that of the conventional line reaming and boring apparatus.

Not only is the mandrel elongated, but the cutting edges of the segments 37 are also elongated and extend along the axis of the mandrel for a considerable distance. Thus, the cutting segments having elongated cutting edges are particularly susceptible to the effects of vibration and would be dulled quite rapidly if vibration were transferred from the spindle to the mandrel and thereby to the cutting segments. Restricting the transfer of vibration to the mandrel is, then, effective to prolong the life of the cutting segments.

While in the foregoing specification embodiments of the invention have been set out in considerable detail for purposes of illustration, it will be appreciated that considerable change may be made in these details without departing from the spirit and principles of the invention.

I claim:

1. In a reaming apparatus of the character set forth, a frame providing a horizontal bed, a work holder supported on said bed by a plurality of thrust bearings arranged to dampen the transfer of horizontal vibrations from said bed to said work holder, said thrust bearings permitting a substantially frictionless movement of said work holder with respect to said bed, a spindle rotatably supported above said bed by means permitting said spindle to be moved toward and away from said bed along a vertical line, a mandrel equipped with a reamer suspended from said spindle for rotation therewith on said vertical line, a universal joint interposed between said reamer and said spindle adapted to constrain said reamer to rotate with said spindle while limiting the transfer of horizontal vibrations from said spindle to said reamer, said reamer providing a plurality of cutting edges extending between vertically spaced points along the outside thereof, whereby the horizontal vibrations between said reamer and said work holder during reaming operations can be greatly reduced with the result that the cutting edges of the reamer will remain sharp over much longer periods of use.

2. In a reamer apparatus of the character set forth, a frame providing a horizontal bed, a work holder supported on said bed by a plurality of thrust bearings arranged to dampen the transfer of horizontal vibrations from said bed to said work holder, said thrust bearings permitting a substantially frictionless movement of said work holder with respect to said bed, a standard connected to said frame and extending above said bed having a motor mounted thereon, a spindle rotatably supported by said standard by means permitting said spindle to be moved toward and away from said bed along a vertical line, a drive mechanism connecting said motor to said spindle, a mandrel equipped with a reamer connected to said spindle by a universal joint constraining said mandrel to rotate with said spindle while permitting limited angular motion thereof independently of said spindle to limit the transfer of horizontal vibrations from said spindle to said mandrel, said reamer providing a plurality of cutting edges extending between vertically spaced points along the outside thereof, whereby the horizontal vibrations between said reamer and said work holder during reaming operations will be reduced to a minimum and thereby the cutting edges of said reamer will be kept sharp over much longer periods of use.

(References on following page)

References Cited in the file of this patent

UNITED STATES PATENTS

| | | |
|---|---|---|
| 308,842 | Hunt | Dec. 2, 1884 |
| 962,474 | Sherod | June 28, 1910 |
| 1,179,511 | Egan | Apr. 18, 1916 |
| 1,368,484 | Cashman | Feb. 15, 1921 |
| 1,774,701 | Davenport | Sept. 2, 1930 |
| 1,903,576 | Skeel et al. | Apr. 11, 1933 |
| 2,091,628 | Carlson | Aug. 31, 1937 |
| 2,670,635 | Evans | Mar. 2, 1954 |

FOREIGN PATENTS

| | | |
|---|---|---|
| 459,122 | Germany | Apr. 28, 1928 |

OTHER REFERENCES

"American Machinist," January 7, 1943, pp. 76–79.